Figure 1:
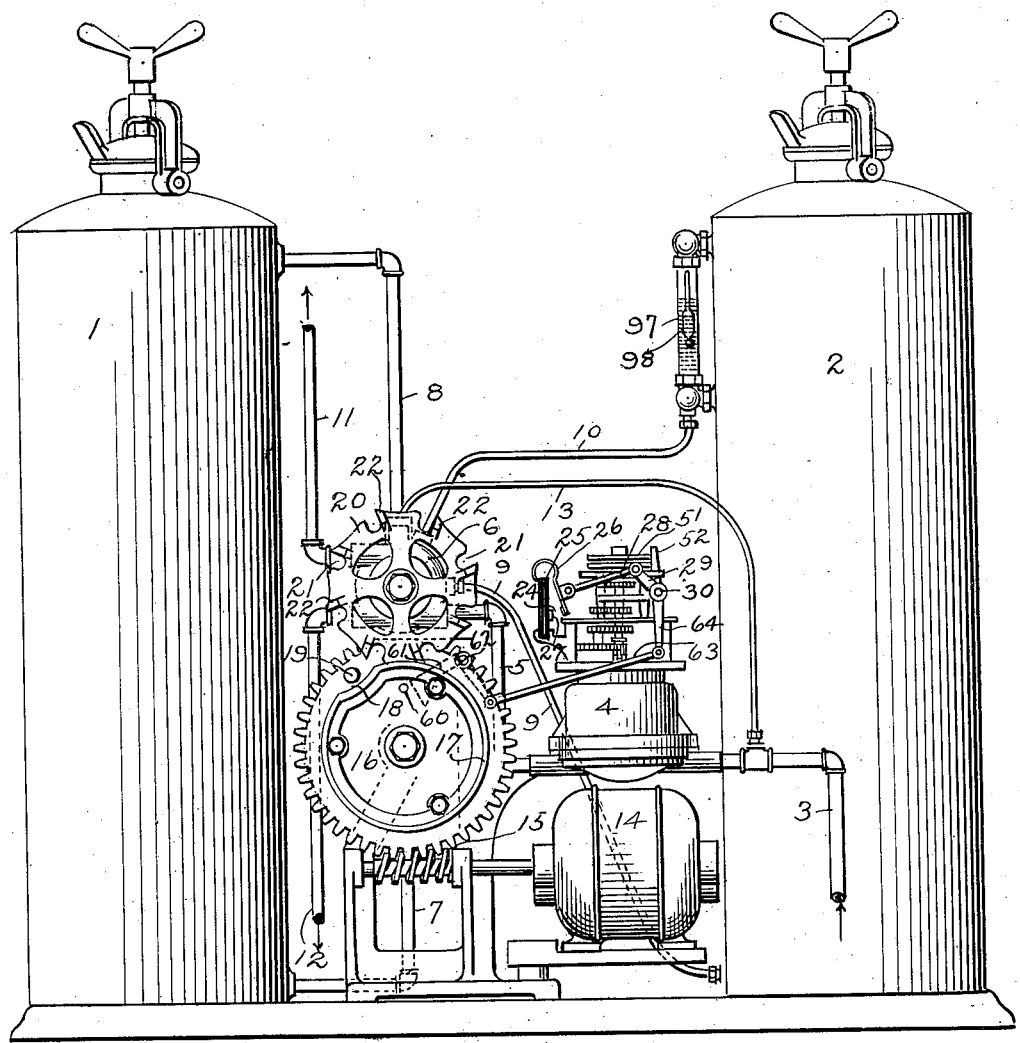

May 23, 1933.  E. J. DE VILLE  1,910,004
AUTOMATIC WATER SOFTENER
Filed June 13, 1927  4 Sheets-Sheet 1

Inventor
Edward J. De Ville
By J. L. Walker
Attorney

May 23, 1933.  E. J. DE VILLE  1,910,004
AUTOMATIC WATER SOFTENER
Filed June 13, 1927  4 Sheets-Sheet 2
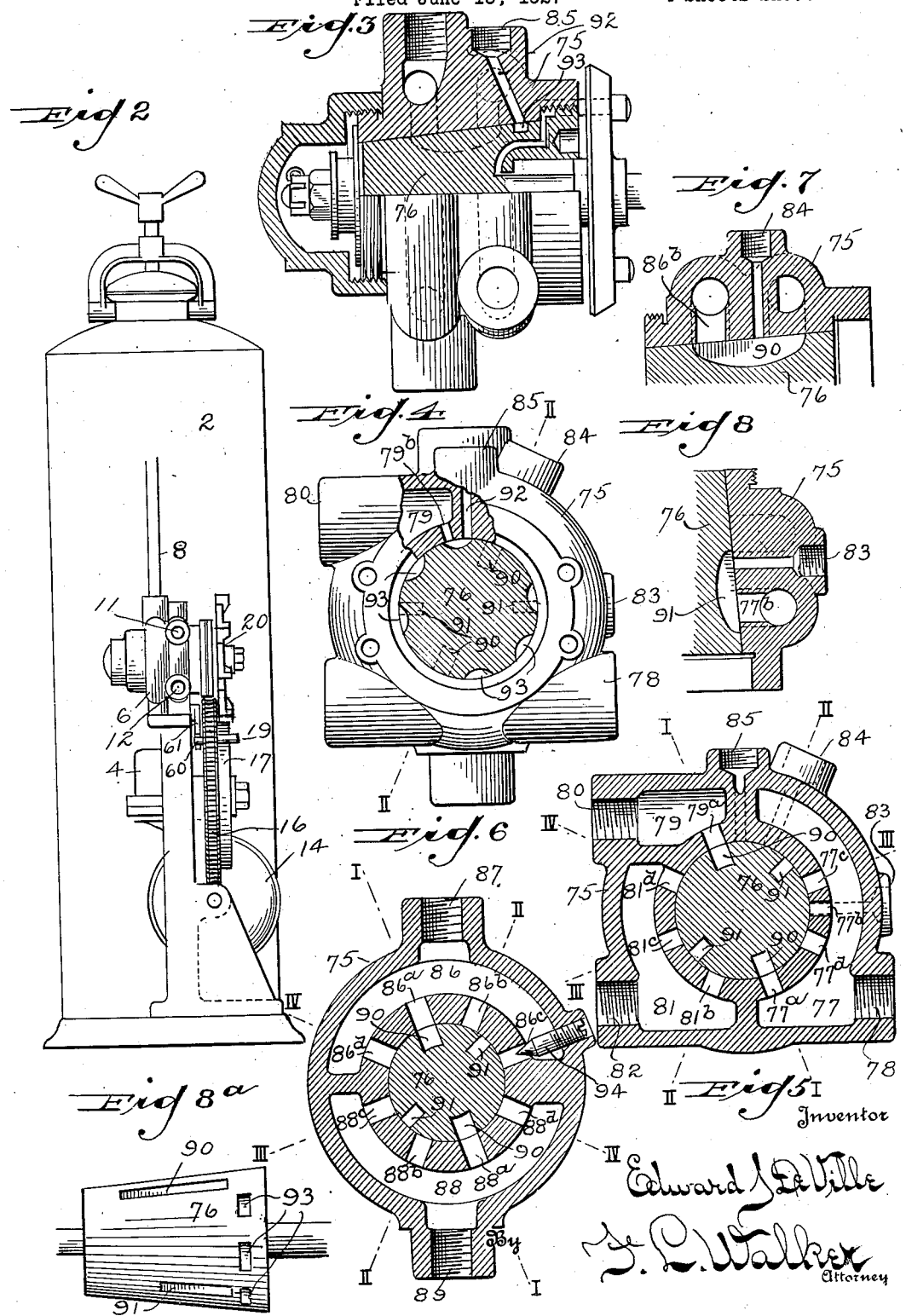

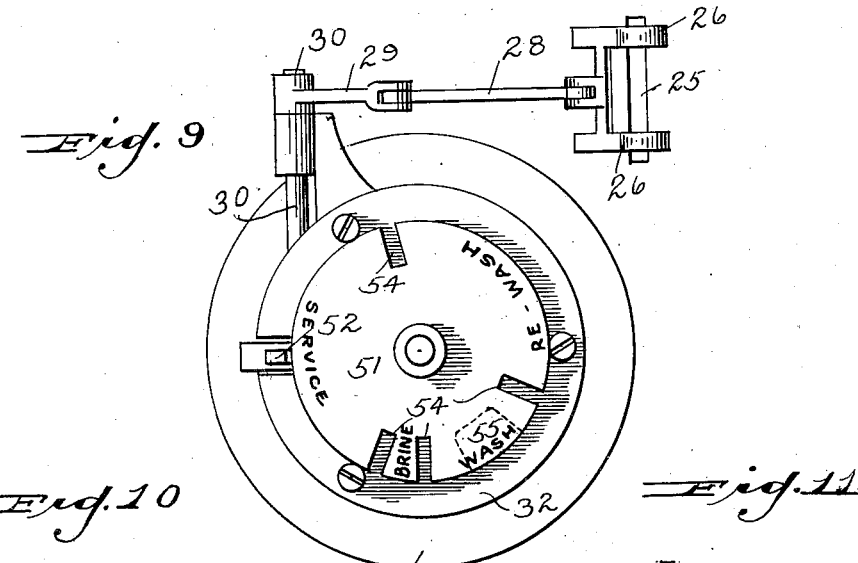
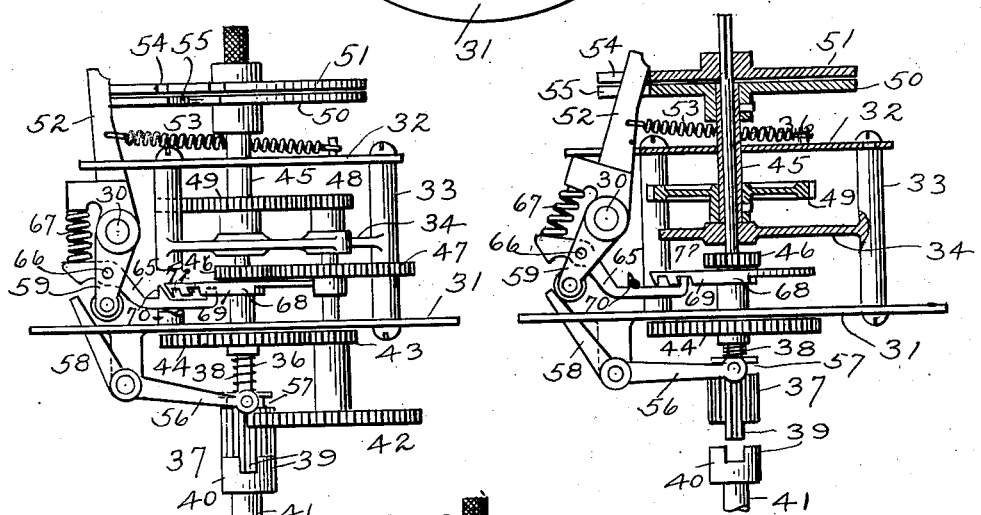
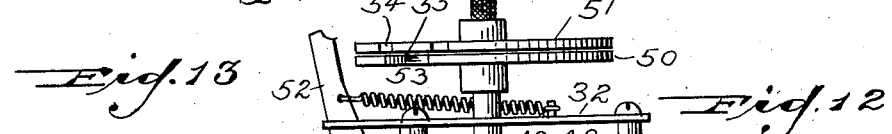
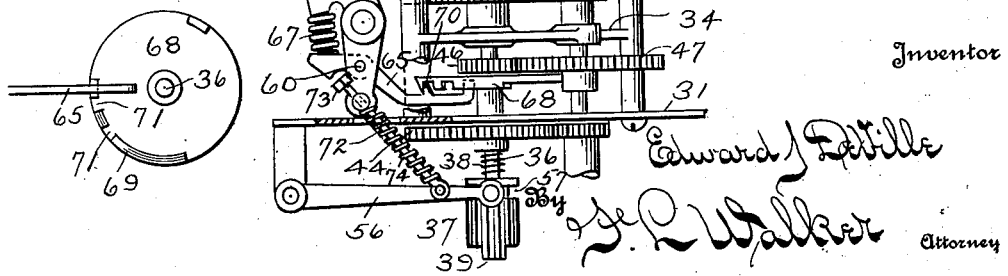

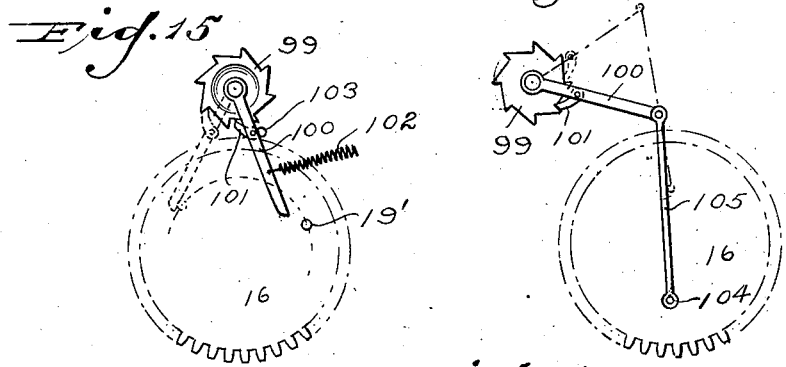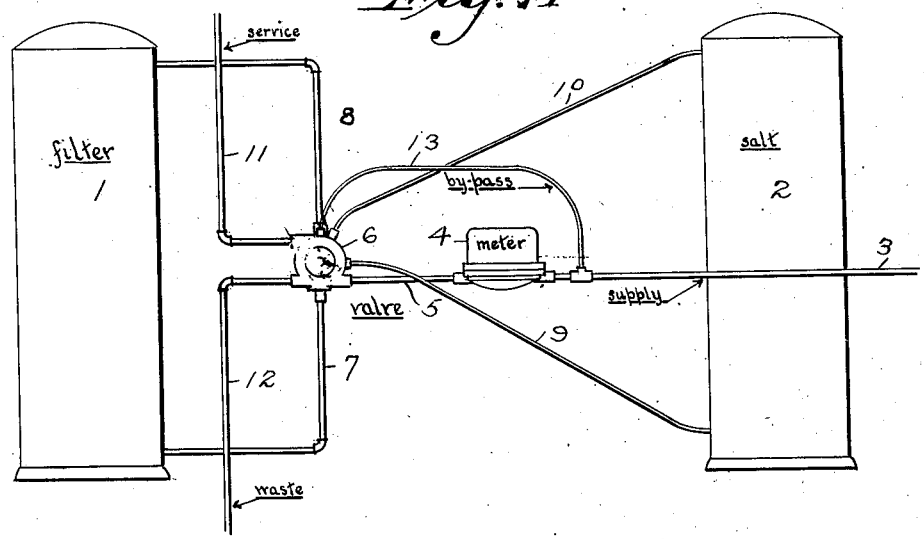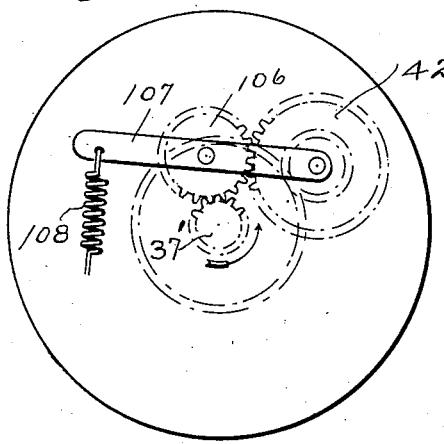

Patented May 23, 1933

1,910,004

UNITED STATES PATENT OFFICE

EDWARD J. DE VILLE, OF DAYTON, OHIO, ASSIGNOR TO THE PERMUTIT COMPANY, OF NEW YORK, N. Y., A CORPORATION OF DELAWARE

AUTOMATIC WATER SOFTENER

Application filed June 13, 1927. Serial No. 198,338.

My invention relates to water softeners of the filter type, and more particularly, to automatic means for periodically reviving the filter bed by circulating therethrough a predetermined amount of regenerating or reviving liquid and for thereafter thoroughly washing the filter bed to remove surplus regenerating agent before again restoring the filter connections to normal distribution setting.

Water softening apparatus of this type usually involves a filter bed of base exchange silicate, variously known as aluminosilicates, zeolites, glauconite, zeolite, or green sand. Such substances, whether natural or artificial, possess the characteristics of inducing the precipitation or deposit of lime and magnesia and other mineral or chemical substances carried by water circulated through such filter bed. When, through the deposit of mineral or chemical substance, such filter beds become inactive or of decreased efficiency in inducing such precipitation or deposit of soluble material in the water being softened, it is customary to "recondition" or "regenerate" such filter beds by circulating therethrough a chemical solution which will neutralize the precipitate or deposit, or remove the same from the filter material, restoring the latter to an active and efficient condition. Salt brine (sodium chloride) is commonly employed as a revivifying or regenerating material. The present apparatus and its operation are not dependent upon the particular material employed as a filter bed, nor upon the character of the reviving or neutralizing agent.

Briefly stated, the present invention is embodied in an apparatus having a tank containing the body of filter material through which the hard water is normally circulated to subject it to the softening action of the bed of filter material, and in conjunction therewith a second tank or vessel containing a body of concentrated regenerating or neutralizing agent. A multi-passage valve is provided, which when turned to successive positions will divert the normal flow of hard water from the source of supply through the filter tank by causing the water to first pass through the tank or container of regenerating or neutralizing agent before passing through the filter tank, thereby carrying with it in solution a quantity of such regenerating or revivifying agent. When a predetermined quantity of the regenerating or neutralizing liquid has been thus distributed through the filter bed, the normal water supply is again connected to the filter tank, first, at the top to wash the revivifying or regenerating liquid downwardly through the filter bed to a waste outlet. Upon the succeeding adjustment of the multi-passage valve the direction of wash water is reversed, carrying the remaining reviving or regenerating material upwardly through the filter bed and thence to the waste outlet. By final adjustment the normal connection of the water supply to the filter tank and its outlet to the distribution system is again established. This step by step adjustment of the valve to establish a predetermined sequence of connections is automatically effected as predetermined quantities of water to be softened, regenerating liquid, and wash and rewash water are passed through the filter tank. Periodic valve adjustment is determined by a meter through which the supply of water for all operations passes. It has been found impractical to employ the common commercial water meter having moving parts actuated by the flow of water therethrough, as an actuator or driving means for effecting the successive adjustments of the valve. By experiment it has been ascertained that even a comparatively small resistance to the operation of the meter will very materially affect the accuracy of measurement, and, under such circumstances, the meter cannot be relied upon to pass any predetermined quantity of water or regenerating liquid before the next operation of the valve. To overcome this difficulty the water meter in the present construction merely governs, but does not actuate an electric switch in the motor circuit. The electric motor is in turn operatively connected with valve operating mechanism. This motor is intermittently operated only sufficiently to advance the valve from one position to the next through a predetermined sequence of operative adjustments. The motor is automatically arrested after each adjustment until the next period of operation. The intervals between succeeding valve operations are dependent upon the flow of water through the meter which may continue over a long or a short period of time. The amount of water to be softened before regeneration or revivification of the filter bed is predetermined, as is also the quantity of regenerating or revivifying liquid, and the quantity of water for wash and rewash purposes. The motor switch timing mechanism operated by the meter is accordingly adjusted. This timing device includes two notched discs concentrically mounted and rotated by the meter at different rates of speed. A trip arm for the electric switch rides upon the peripheries of such discs and is spring actuated into operative position whenever the notches in the differentially driven discs are brought into registry at the point of engagement of the trip arm, allowing the trip arm to enter into such registered notches. As the motor completes the operation of adjusting the valve, the trip arm is automatically restored and detent means is provided for holding the arm in retracted position temporarily until the differential movement of the timing discs have moved the notches out of registry. Means is provided for automatically disconnecting the meter from the timing discs during the interval that the trip arm is momentarily engaged within the registered notches of such discs and for automatically re-connecting the meter with such timing discs as the trip arm is restored.

The multi-way valve controlling the flow of water for the various operations is of the rotary type. It is operated by a Geneva gear or a ratchet movement. One of the elements of such intermittent gear train is mounted upon the stem of the valve and the other element is mounted upon a worm wheel driven by a worm connected with the motor shaft. Such Geneva gear connection serves to actuate the valve through successive step by step movement and locks the valve in its adjusted position during the intervals between such adjustment. In order that the water distribution system supplied through the softener may not be entirely cut off during the period of regeneration and washing of the filter bed, a by-pass is provided which also is controlled by the valve whereby hard water is supplied to such system during the reconditioning period. The valve is so arranged that this by-pass is closed only during the period of normal operation of the softener when soft water is supplied to the distribution system, while in each other position of the valve, during the regenerating, washing and re-washing operations, such by-pass is open for the temporary supply of hard water.

The object of the invention is to simplify and improve the structure and the mode of operation of automatic water softeners and to provide means for accurately determining the gallonage of regenerating liquid passed to the mineral bed, and also to accurately determine the gallonage of wash and rewash water and to accurately determine the total gallonage of water passing through the softener between succeeding regenerating periods.

A further object of the invention is to provide means for automatically adjusting a multi-way valve through a predetermined sequence of intermittent adjustment after predetermined different intervals of operative action of the apparatus.

A further object of the invention is to provide improved means for operating the control valve wholly independent of the means by which the periodic operation of the valve is timed.

A further object of the invention is to provide switch operating means for closing the actuating motor circuit when a predetermined quantity of water has passed through the governing meter.

A further object of the invention is to provide an improved form of governor and means for automatically disconnecting and reconnecting the governor and meter at each operation of the meter switch timing means.

A further object of the invention is to provide means for continuously supplying water through the distribution system during the period of regeneration or revival of the filter bed.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawings, wherein is shown the preferred, but obviously not necessarily, the only form of embodiment of the invention, Fig. 1 is a front elevation of the assembled water softening apparatus forming the subject matter hereof. Fig. 2 is a side elevation thereof. Fig. 3 is a longitudinal sectional view of the rotary valve. Fig. 4 is a front view thereof. Figs. 5 and 6 are transverse sectional views on lines 5—5 and 6—6 of Fig. 3. Figs. 7 and 8 are detailed sectional views on lines 7—7 and 8—8 of Fig. 5. Fig. 8a is a detail view of a valve plug. Fig. 9 is a top plan view of the rotary disc governor for the motor switch. Fig. 10 is a side elevation thereof. Fig. 11 is a similar view partly in section showng the parts in operated positions. Fig. 12 is a side view showing the parts restored, and also a modified connection. Fig. 13 is a detail bottom plan view of detent disc. Fig. 14 is a diagrammatic view of the various conduit connections. Figs. 15 and 16 are detail views of two forms of ratchet actuating means for the valve. Fig. 17 is an automatic safety drive connection between the meter and timing device.

Like parts are indicated by similar characters of reference throughout the several views.

Referring to the accompanying drawings, 1 is the filter tank in which is arranged the filter bed of base exchange silicate or other suitable filter material. 2 is a similar tank in which is contained a quantity of regenerating or neutralizing agent, the usual material being common salt (sodium chloride). While the tanks and control apparatus may be variously disposed in relation with each other, a simple and convenient arrangement of parts for economic assembly and installation is to locate the filter tank 1 and regeneration tank 2 in spaced relation with each other with the operating and control apparatus intermediate these tanks.

A water supply line 3 from any suitable source of supply leads through a water meter 4. This water meter is of any ordinary construction, such as is now commonly used for metering water supplies in residences and for other purposes. From the water meter 4 is a conduit 5 which leads to the rotary multi-way control valve 6. The rotary valve 6, which will be later described in detail, has various connections with the tanks 1 and 2 and also with a waste outlet to a sewer or other place of disposal. A conduit 7 leads from the rotary valve 6 to the bottom of the filter tank 1, while a similar conduit 8 leads from the valve 6 to the top of the same tank 1. Likewise, conduits 9 and 10 interconnect the rotary valve 6 with the bottom and top respectively of the salt or regeneration tank 2. In addition to these connections, the rotary valve 6 is provided with an outlet conduit 11 to the service distribution system and also with a waste outlet 12 leading to the sewer or disposal place. A by-pass conduit 13 interconnects the valve 6 with the supply conduit 3 in advance of the meter, to supply hard water to the service outlet 11 leading to the distribution system during the period of regeneration and washing of the filter bed.

The rotary member of the multi-way valve 6 is actuated into successive positions by the intermittent operation of an electric motor 14. Upon the drive shaft of the motor 14 is mounted a worm 15 intermeshing with a worm wheel 16. This worm wheel 16 makes one complete rotation during each operation of the motor 14, at the conclusion of which the motor 14 comes to rest. The worm wheel 16 forms one element of a Geneva gear movement or stop motion gear train. To this end the face of the worm wheel 16 is provided with a laterally projecting flange 17 interrupted or recessed at 18 and provided with a stud 19 for engagement in the corresponding gear element. The second gear element 20 is mounted upon a stem of the rotary core of the valve 6. This second gear element 20 is of polygonal form, the sides of which are of re-entrant segmental shape agreeing with the radius of the flange 17 of the worm wheel 16, into concentric relation with which these re-entrant segmental faces are successively brought by the step by step rotation of the gear element 20 and valve. At each angle of the polygonal wheel 20, is a notch 21 in which engages the stud 19 of the worm wheel 16 to effect a partial rotation of the polygonal wheel 20 at each complete rotation of the worm wheel 16. The interruption 18 in the flange 17 of the worm wheel affords clearance for the turning movement of the notched angles of the wheel 20. During the intervals between operations the wheel 20 and with it the rotary core of the valve 6 are held locked in their adjusted position by the registry of the re-entrant segmental shape of the wheel with the circular flange 17 of the worm wheel 16. There are four distinct positions of adjustment of the valve 6. The first is the normal softening position in which the hard water is introduced through valve 6 into the filter tank 1 and discharged thence through the valve to the distribution system connected with the outlet 11 from the valve 6. Second, the regeneration position in which the valve 6 is adjusted to connect the water supply through the valve 6 to the salt tank 2 and then back from the salt tank 2 through the valve 6 to the filter tank 1, and to the waste outlet or sewer connection 12 leading from the valve 6. Third, the wash position, in which the salt tank 2 is disconnected from the water supply, and the supply is directed through the valve 6 to the top of the tank 1, and drawn from the bottom through the valve 6 to the waste outlet 12. Fourth, the re-wash position in which the direction of water is reversed, being supplied through the valve 6 to the bottom of the tank 1 and passing upwardly through the filter bed is discharged from the top of the tank through the valve 6 and again to the waste outlet 12. From this last position the valve returns to the normal water softening position. While the intermittently operated polygonal wheel 20 might be provided with four re-entrant segmental sides adapting it to stop in the four positions during the completion of each rotation, for convenience and to improve the ease of operation, the wheel 20 has been made of somewhat larger size and provided with eight of such segmental sides or double the number of operative positions of the valve. The valve 6 has also been provided with a double set of ports and passages, as will later be described, so that during one rotation of the polygonal wheel 20 the valve will complete two cycles of operation.

The notches or recesses 21 in the angles of the polygonal wheel 20 for engagement with the stud 19 are preferably, though not necessarily, reinforced by providing coincident lugs 22 on the forward sides of the recesses. The motor 14 is set in operation by the closing on an electric switch in the motor supply circuit. This switch 24 remains closed until the worm gear 16 has made one complete rotation during which the stud 19 carried thereby engages in a recess 21 of the polygonal wheel 20 to turn the wheel 20, and with it the valve member one step. The valve is then locked in its adjusted position by the engagement of the arcuate side of the polygonal wheel 20 with the flange 17.

The electric switch may be of any suitable type. For convenience of illustration there has been shown a conventional form of contact switch wherein a supporting block 25 of insulating material carries two flexible spring contact arms 26 to be pressed into engagement with stationary contacts 27 upon the supporting block 25. The spring arms 26 are intermittently pressed into engagement with the contact 27 by a link 28 connecting such arms with a rock arm 29 carried by a rock shaft 30 controlled by a timing mechanism.

*Timing mechanism*

The timing device, as before mentioned, is mounted upon and actuated by the meter 4. The timer is shown in various positions of operation in Figs. 9 to 12 inclusive. The frame of such timing mechanism comprises two spaced discs 31 and 32 interconnected by intermediate posts 33 which support an integral plate or web 34 intermediate the discs 32 and 31. The rock shaft 30 is horizontally disposed in bearings carried by this intermediate web or plate 34. Centrally mounted in the frame of the timer mechanism is a vertically disposed rotary shaft 36, which at its lower end carries a sliding elongated gear pinion 37. Such pinion 37 is free upon the shaft 36 so that it rotates independently of the shaft and is capable of longitudinal sliding movement thereon against the yielding resistance of a helical spring 38. The sliding pinion 37 is provided with a clutch face, or with interlocking lugs 39 engageable with a complementary clutch member 40 on the upper extremity of the main shaft 41 of the meter 4. The pinion 37 is back geared to the shaft 36 to drive the latter at a much reduced rate of speed. To this end the sliding gear pinion 37 intermeshes with a large spur gear 42 mounted upon a counter shaft parallel with the shaft 36. Connected with the gear 42 is a small gear pinion 43 intermeshing with a second large gear 44 secured upon the rotary vertical shaft 36. This serves to rotate the shaft 36 at reduced speed. The ratio of speed may be arbitrarily fixed in accordance with conditions of use and the character of the meter 4 and speed of operation of its main shaft 41. In typical practice the ratio adopted has been 16 to 1. That is to say, the shaft 36 is rotated once for each sixteen turns of the meter shaft 41. Mounted about the shaft 36 for independent rotation is a sleeve 45 which is driven from the shaft 36 at a further speed reduction. To this end the shaft 36 is provided with a small gear pinion 46 meshing with a large gear wheel 47 upon a counter shaft. Carried by and rotated in unison with the gear wheel 47 is a small gear pinion 48 in turn meshing with a large gear wheel 49 secured upon the rotary sleeve 45. This ratio of speed reduction may also be arbitrarily fixed to meet conditions of use. In typical practice this second train of speed reducing gears have been proportioned to effect a further reduction of 16 to 1, thereby rotating the sleeve once for each sixteen revolutions of the shaft 36. Carried by the upper ends of the shaft 36 and sleeve 45 are two closely adjacent parallel discs 51 and 50 respectively. These discs are differentially rotated by the mechanism just described wherein the disc 51 makes sixteen revolutions for one revolution of the disc 50. A trip arm 52 rides upon the peripheries of the two discs 50 and 51. This trip arm is carried by the rock shaft 30 and is spring actuated inwardly toward the centers of such discs by the retractal spring 53. The uppermost disc 51 is provided with a series of spaced notches or recesses 54, the spacing of which determines the intervals between successive operations of the valve operating mechanism. The second and lower disc 50 carries a single notch or recess 55. Obviously the trip arm 52 may oscillate inwardly under the retractal influence of the spring 53 only when the notch 55 of the disc 50 and one of the notches 54 of the disc 51 register with each other in a position coincident with the bearing point of the trip arm 52. So long as the notches or recesses 54 and 55 do not come into registry with each other at a point coincident with the point of engagement with the trip arm 52 such notches or recesses will idly pass the trip arm, which during the passage of the notch or recess, rides upon the periphery of the other disc. When, however, in the differential rotation of the discs such registry of the notches 54 and 55 occurs the trip arm 52 is projected within such registered notches by the influence of the retractal spring 53, thereby imparting a rocking motion to the rock shaft 30. This rocking motion is transmitted to the rock arm 29 and link 28 to close the electric switch by pressing the spring contact arm 26 into engagement with the stationary contact 27. This closes the electric motor circuit, setting in motion the motor 14 to drive the worm 15 and thereby rotate the worm wheel 16 through one full rotation. As this tripping action of the arm 52 occurs the timing mechanism is temporarily disconnected from the meter shaft by the longitudinal shifting movement of the elongated gear pinion 37 upon the lower end of the shaft 36. To effect the disengagement of the timer from the meter a shift lever 56 is pivoted in a supporting bracket upon the lower disc 31 of the timer frame. Such shift lever 56 engages in a peripheral groove 57 in the gear pinion 37. This shift lever 56 is provided with an upwardly and rearwardly extending arm 58 projecting into the path of movement of an extension 59 of the trip lever 52. Whenever the trip lever 52 is permitted to oscillate to its operated position as shown in Fig. 11 this extension 59 by its engagement with the arm 58 oscillates the shift lever 56 to withdraw the clutch lug 39 of the pinion 37, from engagement with the driving head 40 of the meter shaft 41. This temporarily arrests the timing mechanism during the period of operation of motor 14 rotating the wheel 16, allowing the switch 24 to remain closed long enough to turn valve 6 from one position to another.

As the worm wheel 16 completes its rotation after having advanced the polygonal wheel 20 one step by the engagement of the stud 19 in a notch 21 of the wheel 20, the motor control switch is automatically opened and the timing mechanism restored. To this end the worm wheel 16 is provided with a stud 60 projecting from its rear face which, as each rotation is completed, engages and oscillates a bell crank lever 61 pivoted at 62 to the supporting frame. The other arm of the bell crank lever 61 is connected by a link 63 with a dependent rock arm 64 secured upon the rock shaft 30. The oscillatory movement of the bell crank 61 due to the camming action of the stud 60 is transmitted to the rock shaft 30 to effect a partial rotation in reverse direction against the tension of the spring 53, thereby withdrawing the operated trip arm 52 from within the registered notches 54 and 55 of the co-acting gears.

The return oscillation of the shaft 30 carries with it the rock arm 29 connected by the link 28 with the spring contact arms 26 of the electric switch thereby pulling such contact arms from engagement with the contact 27 and opening the motor circuit. The electric motor 14 thereupon comes to rest until the timing mechanism again permits the closing of the switch after the circulation of a predetermined quantity of water through the meter and filter bed.

Upon such retractive movement of the parts the trip arm 52 is oscillated to an extreme position beyond its normal position of contact with the peripheries of the discs 50 and 51. Such extreme position is illustrated in Fig. 12. The trip arm is temporarily held in such extreme retracted position until the notches 54 and 55 have moved out of registry with each other by the advance differential movement of the disc 51 incident to the reconnection of the driving gear pinion 37 with the driving head 40 of the meter. As the trip arm 52 is retracted, the extension 59 releases the arm 58 of the shift lever 56 and the driving gear pinion 37 is projected into engagement with the driving head 40 by the expansion of the spring 38. The elongation of the driving gear pinion 37 permits such reciprocatory movement of the pinion into and out of driving engagement with the driving head 40 while maintaining its intermeshing driving engagement with the gear wheel 42. During such shifting movement of the gear pinion the intermeshed teeth slide axially relative to each other. In the event that the clutch head 40 is not properly positioned for re-engagement with the gear pinion 37 at the moment of release of such pinion, the spring 38 will hold the longitudinally movable gear pinion 37 in contact with the driving head 40 until the rotation of the shaft 41 by the meter has properly positioned the clutch faces for interengagement. The expansion of the spring 38 will thereupon effect a renewed driving engagement between the meter shaft and the gear pinion of the timer mechanism.

The trip arm 52 and connected parts are temporarily held in their extreme retracted position by a detent arm 65 pivoted at 66 to the extension 59 of the trip arm 52. This detent arm 65 is spring pressed by a spring 67 into engagement with the underside of a rotating disc 68 secured to and rotating in unison with the main shaft 36. The disc 68 has a dependent beveled flange 69 disposed at spaced intervals and positioned in accordance with the location of the notches or recesses in the timing disc 51. The spring actuated detent arm 65 is provided with a beveled tooth 70, which, as the trip arm is retracted is projected beneath the rotary disc 68 and engages back of the spaced portion of the dependent beveled flange 69 corresponding to the notch or recess from which the trip arm 52 has just been disengaged. This detent arm 65 thus holds the trip arm 52 and connected parts in their extreme retracted position until the disc 68 rotating with the shaft 36 has progressed sufficiently to carry the engaged portion of the dependent flange 69 beyond the engaging tooth 70 bringing one of the intermediate spaces 71 in such flange into registry with such tooth thereby releasing the detent arm 65. During such progressive movement of the shaft and disc 68 necessary to release the detent arm 65 the timing disc 51 has also progressed sufficiently to carry the notch 54 beyond the point of engagement of the trip arm 52. Thus when the trip arm 52 is released by the disengagement of detent 65 from the disc 68 such arm 52 will again engage and be limited in its movement under the influence of the spring 53, by the peripheries of the co-acting timing discs 50 and 51. It will be held inactive in such position while riding upon the periphery of the rotating disc 51 until another notch 54 again comes into registry with the notch 55 at a point coincident with the engagement of such trip arm 52. The cycle of operation will thereupon be repeated.

As will be noted in Fig. 9, the upper or faster rotating disc 51 is provided with a series of recesses or notches 54 differently spaced from each other, while the underlying or slower moving disc is provided with but one notch 55 of somewhat greater width. The relative positions of the notches or recesses 54 in connection with the ratio of differential rotation of the discs determine the intervals of intermittent operations. While the timing discs 50 and 51 may be geared to any differential ratio of rotation and the notches or recesses 54 may be variously located, the relative speed of the discs and the spacing of the notches will depend upon a number of different factors. The capacity of the filter tank, and the extent or bulk of the filter bed of base exchange material contained therein, the speed and capacity of the meter, the degree of hardness of water being treated, and other analogous factors all contribute to the time factor of operation. Obviously in treating water of an extreme degree of hardness the base exchange filter will require reconditioning or regeneration at more frequent intervals, or after a lesser quantity of such extremely hard water has been passed therethrough. Likewise, if a large body of filter material is employed a greater quantity of water may be treated before reconditioning or regeneration becomes necessary. Assuming that the filter bed is of such capacity, and the water to be treated of such degree of hardness that approximately 1500 gallons of water may be treated before reconditioning or regeneration is required, and that seven gallons of salt brine are required to revive the filter bed which is to be followed by the circulation of 40 gallons of wash water in one direction through the filter bed and a back wash of 50 gallons, a total of 1600 gallons of hard water is passed through the meter 4 in completing the full cycle of operation. That is to say, the quantity of water to be softened, comprising 1500 gallons plus the seven gallons of hard water necessary for the regeneration solution, plus 40 gallons of wash water and 50 gallons of backwash necessary to remove the salt solution, followed by a few gallons while the discs are in a "service lap" relation, will total 1600 gallons passing thru the meter 4 during such complete cycle. The lower timing disc 50 will be driven through the spaced reduction gear train through one complete revolution by the action of the meter 4 in measuring such 1600 gallons of raw or hard water. During the same period the upper timing disc 51 will complete sixteen full revolutions for each complete rotation of the lower disc or one rotation for each one hundred gallons. A small segment of the disc 51 is used as a "service lap" portion to hold the trip arm while the notch 55 completes its final movement past the trip arm. The lower disc 50, rotating but once during the whole cycle will serve to hold the trip arm 52 in its normal or inoperative position during the entire softening period or until 1500 gallons of hard water have been passed through the meter 4 and thence through the filter bed within the tank 1. During the flow of such 1500 gallons of hard water through the meter 4 the disc will have been advanced until the recess or notch 55 passes into registry with the trip arm 52. This notch 55 under such condition would be approximately equal in width to $\frac{1}{16}$ of the periphery of the disc, plus sufficient clearance for the trip arm at each end of such space. It would thus remain in registry with the trip arm 52 during a little more than $\frac{1}{16}$ of its rotation. During such interval, while the disc 50 continues to advance, but due to the extreme width of the slot 55 such slot remains in registry with the trip arm 52 until the upper disc 51 will have completed sufficient rotation to have thus brought the several notches or recesses 54 successively into registry with the trip arm 52, and with the wide notch 55 of the underlying disc. As the first of this series of notches or slots 54 comes into registry with the trip arm 52, and the latter falls into such notch or slot thus setting in motion the actuating motor 14, the control valve is advanced one step to shut off the hard water supply directly to the filter tank and divert such water supply from the valve to the bottom of the salt tank or regeneration tank 2 from which the salt solution is discharged at the top of the salt tank, thence again through the valve to the top of the filter tank 1 where it passes downward through the bed of filter material. During such period the bottom of such tank 1 is connected to the waste outlet or sewer connection. This adjustment shunts the hard water through the salt or regeneration tank 2 before it reaches the filter tank and discharges the filter tank through the waste outlet. This continues until approximately seven gallons have been thus passed through the salt or regeneration tank 2 and thence through the filter tank. During this period the disc 51 has rotated through the short segment indicated on Fig. 9 of the drawings by the legend "brine". The trip arm during the same period has been riding upon the margin of such segment. This travel brings the second of the notches or recesses 54 into registry with the trip arm 52, it being understood that due to the slow rotation of the underlying disc 50 the wide notch 55 thereof still remains in registry with the trip arm. The operation of the trip arm into the second of such notches 54 again sets in operation the motor 14 to again actuate the control valve through one step and again restore the switch operating mechanism. This advance step of the valve causes the disconnection of the salt or regeneration tank 2 and directs the supply of hard water passing through the meter 4 and thence to the control valve directly to the top of the filter tank 1, forcing the salt brine in advance of the wash water through the filter bed to the bottom of the tank. While the tank 1 is opened to the waste outlet or sewer, the quantity of wash water admitted during this interval is so proportioned that it will carry the salt brine through the filter bed to the bottom of the tank from which the tank is open to the waste outlet to permit the escape of water in advance of the brine. However, this quantity of wash water is so proportioned that only a portion of the salt brine will be discharged through the outlet from the bottom of the tank, prior to the further adjustment of the valve for the re-wash operation. During such washing period when the brine is being forced to the bottom of the tank through the filter bed, the trip arm 52 rides upon the periphery of the segment of the upper disc indicated by the legend "wash", as such disc 51 continues to rotate. At the end of the interval a third of the notches or recesses 54 is brought into registry with the trip arm 52 by the further rotation of the disc 51 allowing the trip arm to again fall into the notch to again close the motor circuit to effect the operation of the valve a further step to the re-wash position. It will be understood that the notch or recess 55 in the slow moving disc remains in registry with the trip arm 52 due to the extreme width of such recess and the slow speed of the disc. The operation of the motor advances the control valve 6 to reverse the direction of the wash water to the filter bed, admitting the wash water to the bottom of the tank 1 and discharging it to waste or sewer from the top. The trip arm 52 and switch parts controlled thereby, having been restored at the completion of the rotation of the worm gear 16 incident to the adjustment of the valve to the re-wash position, the trip arm will ride upon the periphery of the segment of the disc 51 indicated by the legend "re-wash" until the full predetermined quantity of wash water is so proportioned that little or none of the brine will be lost through the waste outlet. This brine having been driven to the bottom of the filter during the wash operation is forced upwardly again through the filter bed in reverse direction thru the re-wash operation. Thus the quantity of brine or other rejuvenating liquid is twice circulated through the filter bed. It is first forced from the top downward through such filter bed to the bottom of the tank in advance of the wash water. Having been forced to the bottom of the tank by the overlying body of wash water the water supply is reversed and the re-wash water is admitted below such stratum of brine at the bottom of the tank, thus forcing the brine upwardly again through the filter and discharging previously admitted wash water through the outlet from the top of the tank to the waste or sewer connection, and following such discharge by the discharge of the brine or other rejuvenating liquid. This re-wash operation is continuous until all trace of salt solution or regenerating liquid has been removed from the filter. During such period the trip arm 52 rides upon the segment indicated by the legend "re-wash" upon the disc 51. As the re-wash operation is completed the final or fourth slot or recess 54 in such disc is brought into registry with the trip arm 52. The trip arm 52 entering such fourth slot 54 again closes the motor circuit and sets in operation the motor 14 to advance the control valve 6 thereby returning it to its normal operating or softening position. At this period in the cycle of operation the lower disc 50 has been advanced to such point that the recess or notch 55 is about to pass out of registry with the trip arm. The trip arm being restored, as before described, the disc 51 continues to advance while the trip arm rides upon the periphery of the segment of such disc indicated by the legend "service lap". This particular portion of the disc serves to hold the trip arm 52 in its normal or inoperative position while the underlying slow rotating disc 50 advances to carry the wide notch or recess past the trip arm. Thereafter the successive notches 54 in the disc 51 may idly pass the trip arm 52 without affecting its operation since the trip arm rides on the periphery of the underlying disc 50 during the passage of such notches or recesses 54. When the underlying slow rotating disc 50 has completed its full rotation, again bringing the wide recess 55 to operative position, the cycle of operation described will be repeated.

In Fig. 12 is shown a modification of the means for disconnecting the driving pinion 37 to disconnect and reconnect the timing mechanism with the meter. In this modification the shift lever 56 is connected with the extension 59 of the trip arm by a link 72 slidingly adjustable through an eye or opening in the trip arm extension. On the extremity of such link 72 beyond the trip arm extension 59 is a head or collar 73 engaged by the trip arm extension 59 as the arm falls within any one of the slots or notches 54 to close the motor circuit. This contact with the head or collar 73 exerts a pulling influence upon the link 72 to lift the shift lever 56 and with it the gear pinion 37. Upon return movement or retraction of the trip arm 52 the link 72 is not only released to permit the fall of the shift lever 56, but a helical spring 74 coiled about such link 72 is placed under compression by the movement of the trip arm extension 59 to insure the return movement of the driving pinion 37 and its re-engagement with the driving head 40 whenever the clutch faces assume the proper aligned relation incident to the rotation of the shaft 41 by the meter.

Multi-way valve

The valve herein shown is quite analogous to valve structures disclosed in my co-pending applications, Serial Nos. 44,297, filed July 17, 1925, and 50,205 filed Aug. 14, 1925. However, some modifications of the valve structures shown in such co-pending applications have been made to accommodate the valve to automatic operation. This valve comprises a main housing or shell 75, having therein a rotary tapered core or valve plug 76. The shell or housing 75 contains two series of chambers arranged in parallel planes. In the foremost or right hand series as shown in Fig. 3 are three chambers as illustrated in transverse section in Fig. 5. These are respectively the inlet or hard water chamber 77 having the tapped pipe inlet connection 78; the soft water outlet or distribution chamber 79 having the tapped pipe outlet connection 80; and a waste chamber 81 having a tapped pipe outlet connection 82. In addition to these chambers and connections there are also several auxiliary connections and associated ports. An outlet connection 83 communicates to the bottom of the salt or regeneration tank 2. A return connection 84 communicates with the top of the salt or regenerating tank for the return of brine. A further by-pass connection 85 communicates with the hard water supply conduit 3 at a point beyond the meter for temporarily supplying hard water through the period of regeneration or reconditioning. These several connections 83, 84 and 85 are indicated in Fig. 5. The first two are shown in detail in Figs. 7 and 8 and the third in Fig. 3. In the rearmost chamber plane or that shown at the left in Fig. 3 are but two chambers. An upper chamber 86 has a tapped pipe orifice 87 communicating with the top of the filter tank 1. A lower chamber 88 has a tapped pipe connection orifice 89 communicating with the bottom of the filter tank 1. These various chambers have spaced ports communicating with the central conical compartment in the housing or shell 75 in which is located the rotary valve core or plug 76. This rotary core 76 is provided with three series of by-pass ports or peripheral passages (Fig. 8a). There is one pair of by-pass ports 90 comprising longitudinally disposed slots in the peripheral surface of the tapered valve core 76 which are located at diametrically opposite points. In various positions of revoluble adjustments of the core 76 these by-pass ports 90 interconnect the radially disposed ports pertaining to chambers in one series with corresponding ports pertaining to chambers in the other series found in the housing or shell 75. There is a second pair of similar by-pass ports 91 of somewhat smaller dimensions located in the periphery of the rotary valve core or plug 76 in spaced relation with the primary ports 90. The secondary ports 91 are alternately employed for directing hard water to the bottom of the brine or regeneration tank. There is provided a third series of by-pass ports 93 comprising a succession of transversely disposed slots in the periphery of the valve core or plug 76 which successively register with the bypass inlet ports leading from the connection 85 to connect such bypass inlet ports with the outlet or soft water chamber 79 in each succeeding position of adjustment of the valve, except in its normal or water softening position. That is to say, in three of the four adjustments a bypass 93 connects the inlet ports from the connection 85 with the chamber 79. The rotary valve core 76 is reversible. While there are only four operative positions or changes of valve functions there are eight sets or positions to which the core is adjusted. The bypass ports 90 are simultaneously used but in reverse positions during alternating cycles of operation. The secondary bypass ports 91 are employed alternately during alternating cycles of operation. There are two groups of three ports each comprising the series of bypass ports 93, which groups are alternately employed during succeeding cycles of operation. Successive positions of the primary bypasses 90 during the rotation of the core or valve plug 76 through one cycle of operation are indicated by diametrical lines I, II, III and IV in Figs. 5 and 6. During the succeeding cycle the valve ports assume exactly the same positions but with the individual ports of the rotary core or plug 76 reversed.

Valve operation

Referring particularly to Figs. 5 and 6 the valve core 76 is shown in its normal or water softening position. In this position the hard water entering through the connection 78 to the chamber 77 passes thence through the port 77a to the bypass 90 in the valve core 76 which is in registry with the port 88a of the chamber 88 through which the hard water passes, and thence through the connection 89 through conduit 7 to the bottom of the tank 1. After passing upwardly through the filter bed within the tank the treated water is delivered from the top of the tank through the conduit 8 and the connection 87 to the chamber 86 from which it passes through the port 86a on the opposite to the second bypass 90, on the opposite side of the core from that first referred to, which being in registry with the port 79a communicating with the outlet chamber 79 the soft water passes thence through the connection 80 to the distribution conduit 11.

During such normal position of the valve the secondary bypasses 91 are positioned intermediate successive ports of the valve housing chambers and hence are closed or inoperative as shown in Figs. 5 and 6. After sufficient water has passed thus through the meter and thence through the bed of softening material to exhaust the softening effect of the filter bed during which time the meter 4 has operated to effect a full rotation of the slow rotating disc 50 the operation of the trip arm 52 sets in motion the motor 14 to adjust the valve for the next stage of operation, which is that of rejuvenation. During this stage the two tanks 1 and 2 are connected in series the water being discharged through the salt tank 2 and thence through the filter tank 1 to the waste outlet.

In such second position of adjustment of the valve, i. e. the salt or rejuvenating position, the secondary bypass 91 in the adjustable core 76 is brought into registry with the port 77b of the hard water inlet chamber 77 which is thence connected through the bypass 91 with the port of auxiliary outlet connection 83 with which such secondary bypass 91 also registers as shown in Fig. 8. The outlet connection 83 communicates through the conduit 9 with the bottom of the salt or rejuvenation tank 2. After passing upward through the rejuvenating agent, forming a solution, such solution is drawn from the top of the tank 2 through the conduit 10 communicating with the auxiliary inlet connection 84. The port of this inlet connection 84 registers with the one of the bypasses 90 when the core 76 is in such second position of adjustment as shown in Fig. 7. This bypass 90 carries the returning brine or rejuvenating agent thence to the port 86b of the chamber 86 from which the salt brine or rejuvenating solution is conducted through the connection 87 and conduit 8 to the top of the tank 1. At the same time the bottom of the tank 1 is connected through the conduit 7 to the connection 89 and chamber 88 of the valve, and thence through the port 88b with the second bypass 90 of the core 76 which also registers at such time with the port 81b of the waste chamber 81. Thus the water within the tank 1 in advance of the charge of salt brine, or rejuvenating agent, is discharged through the conduit 7, the chambers 88 and 81 and connection 82 to the waste outlet 12.

When the proper quantity of rejuvenating agent has been introduced the valve is automatically adjusted to its third or "wash" position. In such position the secondary bypasses 91 are again positioned intermediate the valve chamber ports and hence closed. One of the bypass ports 90 in such position registers with the port 77c of the hard water supply chamber 77 and simultaneously registers with the port 86c of the chamber 86. This port 86c is preferably provided with a regulating screw or needle valve 94 so that the rate of flow of water may be materially reduced or regulated to extend the time period, during which the salt brine or rejuvenating agent is being forced downward through the filter bed by the following charge of wash water. The charge of rejuvenating agent is caused to pass, but slowly through the filter bed allowing it to permeate the bed and reach every portion and particle of the water softening material to be reconditioned. At the same time the opposite bypass port 90 of the valve core 76 is in registry with the port 88c of the chamber 88, thereby venting the tank 1 through the pipe 7 leading from the bottom thereof to the connection 89 and chamber 88. A bypass 90 connects the port 88c to the port 81c of the waste chamber 81 which communicates through the connection 82 with the waste outlet or sewer connection.

In the fourth or "backwash" position a bypass port 90 of the adjustable core registers with the port 77d of the hard water inlet chamber 77 connecting such port with the port 88d of the chamber 88 through which hard water is conducted to the bottom of the tank 1 through the connection 89 and pipe or conduit 7. This backwash water flows upwardly through the bed of filter material returning ahead of it the salt brine or regenerating solution. Thus rejuvenating agent is again passed through the bed of filter material subjecting such material to a second influence or action thereof. This rejuvenating agent, or salt brine, is then discharged with the backwash water from the top of the tank 1 through the conduit 8 which leads to the chamber 86. The chamber 86 is in communication through the port 86d with the other of the bypasses 90 which also registers with the port 81d of the waste chamber 81 from which the salt brine and backwash water is discharged through the connection 82 to the waste outlet 12.

At the completion of the backwash operation as determined by the amount of water passing through the meter 4 the valve is subjected to a further step which restores it to normal or water softening position in which the bypass ports 90 are positioned in reverse relation, but again in registry respectively with the ports 77a and 88a on one side and with the ports 86a and 79a at the opposite side of such core. During succeeding steps the same cycle of operation is completed through the second half rotation of the valve core 76. While both bypass ports 90 are simultaneously in operation in each position of adjustment, the secondary bypass ports 91 are employed singly and in only one position, to wit, the second or rejuvenating position. The secondary ports are alternated in operation during the succeeding half rotations of the valve.

The third series of bypass ports 93 in the rotary core 76 are so positioned during each of the second, third and fourth positions of adjustment of the valve in each half of the rotation of the core 76 that one or another of such bypass ports will register with the inlet port 92 communicating with the connection 85 and simultaneously with a port 79b leading to the outlet or distribution chamber 79 as shown in Fig. 4. No auxiliary bypass 93 is provided for registry with these ports when the valve core 76 is in its normal or water softening position. The connection 85 communicates through the bypass conduit 13 with the supply conduit 3 at a point beyond the meter. Thus the water supply conduit 3 is connected through such bypass conduit 13 with the water distribution system 11 during each successive stage of reconditioning but is disconnected during the normal water softening period. Thus, during the reconditioning period, hard water is temporarily supplied to the distribution system. The change to hard water and vice versa is automatic. The temporary hard water supply is drawn from conduit 3 beyond the meter 4 in order that such temporary hard water supply will not in any way diminish or affect the periodic intervals of operation as determined by the quantity of water passing through the meter.

In order to accurately determine the density of the rejuvenating or reconditioning solution being discharged from the tank 2 such tank is provided with a water gage glass 97 in which is located a hydrometer 98.

The valve structure, connections and operation as above described for upflow softening and initial downflow brining followed by an upward back wash can of course be readily modified as desired for various other cycles of operation; such for example as downflow softening with upflow back washing and down flow brining and rinsing.

In Fig. 14 the various conduit connections are shown diagrammatically for convenience in tracing the water under various conditions of operation.

While the intermittent gear or Geneva movement actuating train shown in Fig. 1 is preferred for operating the valve at intervals, such valve may be operated by a pawl and ratchet means as shown in Figs. 15 and 16. In Fig. 15 the ratchet wheel 99 is shown mounted upon the stem of the control valve 6. Loosely mounted on the same stem and concentric with the ratchet wheel 99 is an oscillatory lever arm 100 extending into the path of travel of a stud 19′ on the worm wheel 16. The arm 100 carries a pawl 101 engaging with the teeth of the ratchet wheel 99. The engagement of the stud 19′ with the arm 100 moves the arm to the dotted line position carrying with it the ratchet wheel 99 and thereby turning the valve one step to its succeeding position. The arm 100 is retracted by a spring 102. The return movement of the arm is limited by the stop pin 103. This construction can be substituted for the Geneva gear or stop motion mechanism before described.

In Fig. 16 the oscillatory arm 100 is shown connected with a wrist pin 104 upon the worm gear 16 by a pitman or connecting rod 105. This construction turns the valve slowly through half the rotation of the worm wheel 16, the pawl being retracted for succeeding operations through the remaining half rotation. The throw of the pawl is preferably slightly greater than the distance between the teeth of the ratchet wheel as shown in Fig. 16. This insures an ample retractive movement of the pawl and a slight idle advance at the beginning of its stroke.

In lieu of automatically disengaging the driving pinion 37 from the meter shaft 41 during the operative movement of the valve adjusting means there has been shown in Fig. 17 a modification wherein the driving engagement is automatically relieved in the event of undue pressure or strain. Referring to Fig. 17 the gear pinion 37′ corresponding to the gear 37 of the preceding construction is mounted directly upon the shaft 41 of the meter. It is connected with the driven gear 42 through an idler pinion 106 which is carried upon an oscillatory arm 107. The arm 107 is pivoted concentrically with the gear 42 so that the pinion 106 maintains its intermeshing engagement with the gear 42. This pinion 106 is yieldingly drawn into intermeshing engagement with the driving pinion 37′ by a spring 108. In the event that the timing mechanism meets with resistance, as for instance if the discs are rotated into contact with the trip arm before the latter is fully retracted from the registering notches, such resistance to rotation of the driven gears will cause the pinion 37′ to cam the gear pinion 106 out of mesh against the resistance of the spring 108. Of course the spring will immediately bring the gear 106 back into engagement with the pinion and the camming action and vibration of the arm 107 will continue so long as resistance to the rotation of the gears of the timing mechanism is encountered. This automatic release of the engagement of the pinion 37′ and the gear 106 will prevent breakage of parts.

From the above description it will be apparent that there is thus provided a device of the character described, possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. A water softening apparatus wherein a body of water softening material is periodically reconditioned by the circulation therethrough of a quantity of rejuvenating agent and subsequently washed, said apparatus including a water supply and service distribution system and a single multi-way valve common to the various conduits of the apparatus for variously directing the water flow during successive stages of the cycle of operation, mechanical means for operating said valve, and a meter measuring the water flow and timing the operation of said mechanical valve operating means in accordance therewith and a bypass controlled by bypass ports in said valve automatically connecting the water supply with the service distribution system independent of the meter during the period of reconditioning, but disconnected therefrom during the period of water softening.

2. In a water softening apparatus, a container for water softening material subject to periodic reconditioning of the softening material including successive periods of rejuvenation, wash and backwash, a single source of water supply for said apparatus during the softening, rejuvenation, wash and backwash periods, a source of supply of rejuvenating material, a series of conduits for variously connecting the container with the source of supply and with the source of rejuvenating material, with a service distribution outlet and with a drain, a motor actuated valve common to said series of conduits controlling the periodic operations, an electric motor for progressively adjusting said valve at intervals in accordance with the amount of water supplied during each such period of operation and a timing device having moving parts actuated by the water flow for intermittently energizing the motor.

3. A water softening apparatus wherein a body of water softening material is periodically reconditioned by the circulation therethrough of a quantity of rejuvenating agent and subsequently washed, including a water meter and an adjustable valve variously directing the water flow during successive stages of operation, characterized by an intermittent gear drive train for said valve, electric actuating means for the intermittent gear train and means controlled by the meter for setting said actuating means in operation at the completion of each stage in the cycle of operation of water softening and reconditioning of the softening material and in response to the respective quantities of water flowing through the meter during said successive stages.

4. A water softening apparatus wherein a body of water softening material is periodically reconditioned by the circulation therethrough of a quantity of rejuvenating agent and subsequently washed, including a water meter and an adjustable valve variously directing the water flow during successive stages of operation, a toothed wheel connected with said valve, a rotary actuating wheel having intermittent operative engagement with the toothed wheel to advance the wheel through successive steps of rotation, means for locking the wheel against rotation intermediate said steps, and means independent of the meter for rotating the actuating wheel.

5. A water softening apparatus wherein a body of water softening material is periodically reconditioned by the circulation therethrough of a quantity of rejuvenating agent and subsequently washed, including a water meter and an adjustable valve variously directing the water flow during successive stages of operation, a Geneva gear train, one element of which is connected with the valve, the other element of which is rotated to intermittently actuate the first element and to lock said element against operation intermediate the periodic actuation, means for actuating the second element of such train, and means controlled by the meter for determining the time of actuation of the first element in accordance with the quantity of water passing through the meter.

6. A water softening apparatus wherein a body of water softening material is periodically reconditioned by the circulation therethrough of a quantity of rejuvenating agent and subsequently washed, including a water meter and an adjustable valve variously directing the water flow during successive stages of operation, a Geneva gear train for periodically actuating said valve, said gear train being adapted to stop motion of the valve between periods of actuation, an electric motor intermittently actuating the gear train, an electric switch controlling the motor, means governed by the meter for intermittently closing the switch in accordance with the respective quantities of water measured by the meter during the successive stages of the cycle of operation, and means for automatically reopening the switch upon each adjustment of the valve.

7. A water softening apparatus wherein a body of water softening material is periodically reconditioned by the circulation therethrough of a quantity of rejuvenating agent and subsequently washed, including a water meter, an automatically operable valve variously directing the water flow during successive stages of operation and a motor for operating the valve, characterized by a timing mechanism for the automatic valve operation controlled by the meter with means for automatically disconnecting the meter and timing mechanism during each period of valve operation by the motor and for thereafter automatically reconnecting the meter and timing mechanism upon completion of the valve operation.

8. A water softening apparatus wherein a body of water softening material is periodically reconditioned by the circulation therethrough of a quantity of rejuvenating agent and subsequently washed, including a water meter, an automatically operable valve variously directing the water flow during successive stages of operation and a motor for operating the valve, characterized by a trip arm controlling the operation of the valve, a pair of differentially rotating discs actuated by the meter and adapted to release said trip arm to effect the actuation of the valve when in the course of their differential rotation they assume predetermined relative positions of rotation, means for restoring the trip arm, and detent means for temporarily holding the trip arm in retracted position independent of the relative positions of the discs.

9. A water softening apparatus wherein a body of water softening material is periodically reconditioned by the circulation therethrough of a quantity of rejuvenating agent and subsequently washed, including a water meter, an automatically operable valve variously directing the water flow during successive stages of operation and a motor for operating the valve, characterized by a trip arm controlling the operation of the valve, a pair of differentially rotating notched discs actuated by the meter, one of said discs having therein a series of spaced notches pertaining to the periods of reconditioning and restoration to softening condition, the other disc having therein a notch brought into registry successively with the notches of the first disc at the end of a predetermined period of softening operation, thereby permitting the trip arm to enter said registered notches to enable the actuation of the valve to each succeeding stage of operation, and means to restore the trip arm after each operation.

10. A water softening apparatus wherein a body of water softening material is periodically reconditioned by the circulation therethrough of a quantity of rejuvenating agent and subsequently washed, including a water meter, an automatically operable valve variously directing the water flow during successive stages of operation and a motor for operating the valve, characterized by a trip arm controlling the operation of the valve, a rotary disc actuated by the meter and normally rendering the trip arm inoperative and adapted to release the arm when rotated to a predetermined position, means for restoring the trip arm after each operation, a detent for the trip arm, a detent disc rotated by the meter with which the trip arm detent is temporarily engaged upon retraction, said detent being subsequently released by the rotation of said disc.

11. A water softening apparatus wherein a body of water softening material is periodically reconditioned by the circulation therethrough of a quantity of rejuvenating agent and subsequently washed, including a water meter, an automatically operable valve variously directing the water flow during successive stages of operation and a motor for operating the valve, characterized by a trip arm controlling the operation of the valve, a rotary disc actuated by the meter and normally rendering the trip arm inoperative and adapted to release the arm when rotated to a predetermined position, means for restoring the trip arm after each operation, and driving means for said disc including a detachable clutch for interconnecting the disc with the meter and means for automatically disengaging and re-engaging the driving clutch and meter in unison with the movement of the trip arm into and out of operative position.

12. In a water softening apparatus, a container for water softening material, a water supply leading thereto and a service distribution conduit supplied therefrom, means for effecting the periodic reconditioning of the water softening material, a valve controlling successive periods of water softening and reconditioning including a period of rejuvenation and successive periods of wash and backwash, and an electric motor for periodically adjusting the valve to successive positions to effect water softening, rejuvenation, wash and backwash of the filter bed, an electric switch and timing means therefor having moving parts moved and controlled by the flow of water to the container for effecting the closure of the switch to energize the motor at the conclusion of each of four successive periods in the cycle of operation.

13. In a water softening apparatus, a container for water softening material, a water supply leading thereto and a service distribution conduit supplied therefrom, means for effecting the periodic reconditioning of the water softening material including a valve controlling a cycle of four successive operations consisting of softening, rejuvenation, wash and backwash, an electric motor for adjusting the valve to successive positions to effect such cycle of operation, a starting switch therefor and a water meter operated by the water supply and having moving parts actuated by the flow of water therethrough for moving the switch.

14. In an automatic water softener, a filter tank for water softening material, a tank for reconditioning agent, an adjustable control valve normally supplying water from a suitable source through said filter tank independent of said reconditioning agent tank, said valve upon adjustment operating to connect the said tanks in series whereby the water is supplied through the reconditioning agent tank and thence to the filter tank, a meter and timing mechanism for automatically timing the valve operation in accordance with the quantity of water discharged through the tanks, and a bypass conduit also controlled by said valve through which water is bypassed to service around said meter and around both tanks during the period of series operation of the tanks.

15. In a water softening apparatus, a container for water softening material, a container for rejuvenating agent, a meter measuring a supply of water, an adjustable valve normally directing the water supply from said meter to the container of softening material and thence to a service outlet during a softening period, said valve being controlled by said meter to temporarily connect the said containers in series during a period of rejuvenation and again to supply water directly to said container of softening material and thence to a waste outlet during a washing period, and a bypass conduit in connection with by-pass ports in said valve adapted to maintain a water supply around said meter through said conduit and valve to said service outlet during the rejuvenation and washing periods and to be inoperative during the softening period.

16. A water softening apparatus wherein a body of water softening material is periodically reconditioned by the circulation therethrough of a quantity of rejuvenating agent and subsequently washed, including a water meter and a motor-operated valve variously directing the water flow during the successive stages of softening and reconditioning and a motor operating the valve, characterized by a trip arm controlling the operation of the valve motor, a pair of differentially rotating discs actuated by the meter and normally rendering the trip arm inoperative, said discs being adapted upon their differential rotation into predetermined relative positions to enable the operation of the trip arm to effect the starting of the motor moving the valve to its successive positions of adjustment.

17. In an apparatus of the character described, a pair of concentrically mounted revolvable discs having therein marginal notches, driving means for differentially rotating the discs, a spring actuated member normally riding upon the discs and movable into registered notches thereof, a secondary mechanism controlled by the movement of said member, and means for disconnecting the driving means upon the operative movement of said member into registered notches.

18. In an apparatus of the character described, the combination with a water softening apparatus of means for controlling the operation thereof including a valve, a motor actuating the valve, a meter measuring the flow of water utilized by the softening apparatus, a pair of concentric discs having marginal notches therein differentially rotated by the meter, a spring actuated switch arm bearing upon the discs and entering within the notches when brought into registry, a switch controlling the motor closed by the movement of the arm, and means, operated by the movement of the valve, for restoring the arm.

19. In an automatic motor-operated water softener a combination with conduits and connections adapted for operation of the softener in a cycle of successive stages, of a multi-way valve adapted to control all the operations of said cycle, said valve comprising a plurality of valve chambers with a rotatable member having a plurality of bypass channels adapted to make successive conduit connections effecting the successive stages of operation and completing the cycle upon rotation of the rotatable member through a series of equal angles in the same direction, a motor and a valve actuating mechanism driven by the motor and comprising a drive member operatively connected with the rotatable member and adapted to turn the rotatable member through a series of equal angles by successive actuations of the actuating mechanism.

20. A water treating apparatus adapted for a cycle of operations which comprises a treatment tank having pipe connection with a plurality of liquid lines through a common multi-way valve having a casing containing a plurality of chambers connected respectively with the treatment tank at two points and with the various liquid lines, a central rotatable member with passages formed therein, said chambers and rotatable member being adapted to make successive connections for a cycle of operations upon rotation of the member through a succession of equal angles, a motor and a valve actuating mechanism driven by the motor and comprising a drive member operatively connected with the rotatable member and adapted to turn the rotatable member through a series of equal angles by successive actuations of the actuating mechanism.

21. A regenerative base exchange water softening apparatus adapted to automatic operation, comprising valve means for controlling the regenerating operations, operating mechanism for the valve means, a rotary motor, a speed reducing mechanism through which the motor intermittently drives the valve operating mechanism, a member adapted to make and break connection between the running motor and the valve operating mechanism, means for energizing the motor, and means for de-energizing the motor operable by the speed reducing mechanism while the connection between the motor and the valve operating mechanism is broken.

22. A regenerative base exchange water softening apparatus adapted for automatic operation and comprising valve means for controlling the regenerating operation, operating mechanism for the valve means, an electric motor, a speed reducing mechanism through the medium of which the rotor of the motor drives the valve operating mechanism, said speed reducing mechanism including an intermittent gear through which there is established and broken connection between the motor while running and the valve operating mechanism, a motor circuit, a switch in said circuit, means for closing said switch and means operatively connected with the speed reducing mechanism for opening the switch while the connection between the motor and the valve operating mechanism is broken.

In testimony whereof, I have hereunto set my hand this 18th day of May, A. D. 1927.

EDWARD J. DE VILLE.